Patented July 31, 1945

2,380,716

UNITED STATES PATENT OFFICE 2,380,716

WATER SOLUBLE COMPOUNDS HAVING VITAMIN K ACTIVITY

Bernard R. Baker, Nanuet, N. Y., assignor to Lederle Laboratories, Inc., New York, N. Y., a corporation of Delaware No Drawing. Application June 25, 1942, Serial No. 448,494

2 Claims. (Cl. 260—461)

This invention relates to water-soluble derivatives of 2-methyl-1,4-naphthohydroquinone having anti-hemorrhagic activity, and more particularly relates to monoacyl-2-methyl-1,4-naphthohydroquinone monophosphoric acid esters and salts thereof.

One of the more active anti-hemorrhagic compounds of the vitamin K type is 2-methyl-1,4-naphthoquinone, it being very widely used in the treatment of hypo-prothrombinemia, hemorrhagic diathesis of the newly born, post-operative bleeding in jaundice, and persons having prothrombin deficiencies.

The quinone, however, is not entirely satisfactory for all types of administration. For example, it is water-insoluble and cannot be satisfactorily administered parenterally. Furthermore, it is extremely sensitive to light. The 2-methyl-1,4-naphthoquinone may be reduced to the corresponding hydroquinone which is stable to light and which has a satisfactory anti-hemorrhagic activity. However, the 2-methyl-1,4-naphthohydroquinone is not water-soluble, and hence cannot be utilized in the preparation of aqueous parenteral solutions. In the past, aqueous solutions of the sodium bisulfite addition compounds of 2-methyl-1,4-naphthoquinone and the mono-glycosides of the corresponding hydroquinone have been used for parenteral administration. These prior art aqueous solutions are not entirely satisfactory preparations, and it is desirable that a satisfactory preparation be provided. One of the disadvantages of the aqueous solutions of the sodium bisulfite addition compounds is that in neutral solutions they cannot be sterilized by heat and must be kept at the objectionably low pH of 2.5 in order to avoid loss of activity. The mono-glycosides suffer the disadvantages of being difficult and expensive to prepare and forming somewhat unstable solutions.

In accordance with the present invention it has been found that the hitherto unknown monoacyl-2-methyl-1,4-naphthohydroquinone monophosphoric acid esters will form extremely water-soluble salts. These aqueous solutions are essentially neutral, stable under ordinary conditions, and can be readily sterilized by heat without loss of anti-hemorrhagic activity. The solutions can be used orally, intramuscularly or intravenously and show approximately the same activity as the sodium bisulfite addition compounds or the mono-glycosides.

A suitable method for preparing a representative compound, monoacetyl-2-methyl-1,4-naphthohydroquinone disodium phosphate will be illustrated in conjunction with the following specific example. It should be understood, however, that the example is given merely by way of illustration and the invention is not to be limited to the details set forth therein.

*Monoacetyl-2-methyl-1,4-naphthohydroquinone disodium phosphate*

To a mixture of 1.3 cc. of phosphorous oxychloride and 3 cc. of pyridine cooled in an ice bath was added a solution of 2 g. of 2-methyl-1,4-naphthohydroquinone monoacetate in 4 cc. of pyridine. After being heated at 100° C. for fifteen minutes, the mixture was diluted with water with ice cooling and neutralized with sodium carbonate. The aqueous solution was evaporated to dryness in vacuo and the residue extracted with hot acetone. Evaporation of the acetone in vacuo gave a gum which was purified by solution in hot butanol followed by cooling to 0° C. The product (1 g.) was obtained as a hygroscopic white powder.

An improvement in yield was obtained by the following procedure. To a mixture of 13 cc. of phosphorous oxychloride and 20 cc. of pyridine was added dropwise with ice cooling a solution of 20 g. of the monoacetate of 2-methyl-1,4-naphthohydroquinone in 40 cc. of pyridine at such a rate that the temperature was 15-20° C. After thirty minutes at 25° C. the solution was poured on cracked ice and neutralized with 36 g. of anhydrous sodium carbonate, then evaporated to dryness in vacuo. The gummy sodium salt was extracted with 300 cc. of hot butanol (100° C.) and the solvent removed in vacuo. The residue was dissolved in isopropyl alcohol and on being cooled to 0° C. 31.5 g. (90%) of product separated. It was purified by solution in hot butanol and addition of several volumes of isopropyl alcohol, yield 20 g. (60%).

The monoacetyl-2-methyl-1,4-naphthohydroquinone employed in the above process may be conveniently prepared by treating the diacetate of 2-methyl-1,4-naphthohydroquinone in methanol with ammonium hydroxide at room temperature for about twenty-four hours and recrystallizing from a suitable solvent.

The monoacetyl derivative of 2-methyl-1,4-naphthohydroquinone is the preferred monoacyl derivative for carrying out the above reaction because of its cheapness and availability. Instead of the monoacetate any other organic monoacyl derivative of 2-methyl-1,4-naphthohydroquinone may be employed. Among the suitable ones may be included monopropionyl, monobutyryl, monosuccinyl, monolactyl, monobenzyl, and the like.

In the salt-forming step sodium carbonate is preferred. It should be understood, however, that suitable bases of any alkali-forming metals may be employed instead thereof, including those of potassium, lithium, calcium, and the like.

An intramuscular preparation of the vitamin K compound, 1-acetoxy-2-methyl-4-naphthyl disodium phosphate can be prepared as follows:

For 1 liter of solution:

| | Grams |
|---|---|
| 1-acetoxy-2-methyl-4-naphthyl disodium phosphate | 8.68 |
| Sodium bisulfite | 1.20 |
| Sodium chloride | 8.00 |

Distilled water q. s. to 1000 cc.

The sodium bisulfite is dissolved in the distilled water (about 800 cc.) and the sodium chloride added. After solution is complete the 1-acetoxy-2-methyl-4-naphthyl disodium phosphate is dissolved. The solution is adjusted to 1000 cc. volume with distilled water and filtered through a porous glass filter to remove lint. (The glass filter is washed with a solution of 0.12% bisulfite in distilled water prior to filtering the vitamin solution.) The clear, lint-free, colorless liquid is filled in 1 cc. ampules and sterilized by heating at 100° C. for twenty minutes.

It is obvious that the preceding description and examples are intended to be illustrative only and that they may be varied or modified to a considerable extent without departing from the spirit of the invention or sacrificing the advantages thereof. I do not, therefore, intend to limit myself to the specific embodiments herein set forth except as indicated in the appended claims.

I claim:

1. An alkali forming metal salt of monoacetyl-2-methyl-1,4-naphthohydroquinone monophosphoric acid ester.

2. The compound monoacetyl-2-methyl-1,4-naphthohydroquinone disodium phosphate.

BERNARD R. BAKER.